United States Patent
Singh et al.

(10) Patent No.: US 10,602,483 B2
(45) Date of Patent: Mar. 24, 2020

(54) MOBILE TERMINATED IMS CALLS ON DEVICES WHICH SUPPORT WI-FI AND CELLULAR RADIOS

(71) Applicant: Apple Inc., Cupertino, CA (US)

(72) Inventors: Ajoy K. Singh, Milpitas, CA (US);
Paul V. Flynn, Menlo Park, CA (US);
Syed Aon Mujtaba, Santa Clara, CA (US); Vinay R. Majjigi, Sunnyvale, CA (US); Wen Zhao, San Jose, CA (US);
Xiaowen Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 14/870,395

(22) Filed: Sep. 30, 2015

(65) Prior Publication Data
US 2016/0174191 A1 Jun. 16, 2016

Related U.S. Application Data

(60) Provisional application No. 62/091,009, filed on Dec. 12, 2014.

(51) Int. Cl.
*H04W 68/12* (2009.01)
*H04W 60/00* (2009.01)
(Continued)

(52) U.S. Cl.
CPC ......... *H04W 68/12* (2013.01); *H04W 60/005* (2013.01); *H04L 61/2007* (2013.01);
(Continued)

(58) Field of Classification Search
CPC ... H04W 60/005; H04W 68/12; H04W 36/14; H04W 76/026; H04W 8/04; H04W 88/06; H04L 61/2007; H04L 61/6077
See application file for complete search history.

(56) References Cited

U.S. PATENT DOCUMENTS 8,103,278 B2  1/2012  Tsao
2007/0217354 A1  9/2007  Buckley
(Continued)

FOREIGN PATENT DOCUMENTS

CN  101019451 A  8/2007
CN  101197738 A  6/2008
WO  2014148970 A1  9/2014

OTHER PUBLICATIONS

3rd Generation Partnership Project, "Technical Specification Group Services and System Aspects; IP Multimedia Subsystem (IMS); Stage 2 (Release 13)." 3GPP TS 23.228 V13.0.0 (Sep. 2014), Sep. 2014. (Year: 2014).*

(Continued)

*Primary Examiner* — Robert M Morlan
(74) *Attorney, Agent, or Firm* — Kowert Hood Munyon Rankin and Goetzel PC; Jeffrey C. Hood

(57) ABSTRACT

Embodiments relate to apparatus, systems, and methods for reception of calls on a mobile device that includes Wi-Fi and cellular radios. The mobile device may be configured to establish communication on a Wi-Fi network with a cellular carrier. The mobile device may further be configured to register a first IP address with an IMS server for the Wi-Fi network communication and register a second IP address with the IMS server for the cellular network communication (or register different ports of a single IP address with Wi-Fi and cellular). Upon occurrence of a mobile terminating call from the cellular carrier, the mobile device may receive an incoming call notification on one or both of the Wi-Fi network using the first IP address and the cellular network using the second IP address.

20 Claims, 11 Drawing Sheets

(51) Int. Cl.
  *H04W 88/06* (2009.01)
  *H04W 36/14* (2009.01)
  *H04L 29/12* (2006.01)
  *H04W 8/04* (2009.01)
  *H04W 76/16* (2018.01)

(52) U.S. Cl.
  CPC ........... *H04L 61/6077* (2013.01); *H04W 8/04* (2013.01); *H04W 36/14* (2013.01); *H04W 76/16* (2018.02); *H04W 88/06* (2013.01)

(56) References Cited

U.S. PATENT DOCUMENTS

| | | |
|---|---|---|
| 2007/0280154 A1 | 12/2007 | Gupta et al. |
| 2008/0089308 A1 | 4/2008 | Jentz |
| 2008/0247344 A1* | 10/2008 | Bahl ................. H04W 52/0274 370/310 |
| 2011/0216701 A1* | 9/2011 | Patel .................. H04L 65/1016 370/328 |
| 2011/0319073 A1 | 12/2011 | Ekici et al. |
| 2011/0319075 A1* | 12/2011 | Sharma ................... H04W 4/14 455/432.2 |
| 2012/0033798 A1* | 2/2012 | Eardley ................... H04M 3/54 379/211.01 |
| 2012/0166618 A1 | 6/2012 | Dahod et al. |
| 2012/0294259 A1* | 11/2012 | Breau ................. H04L 61/2007 370/329 |
| 2014/0211610 A1 | 7/2014 | Ku et al. |
| 2014/0376511 A1* | 12/2014 | Kalapatapu ......... H04L 65/1016 370/331 |
| 2015/0163743 A1* | 6/2015 | Narasimha ........ H04W 52/0254 370/311 |
| 2016/0066232 A1* | 3/2016 | Wang .................... H04W 48/18 370/332 |
| 2016/0135231 A1* | 5/2016 | Lee ....................... H04W 68/12 370/329 |
| 2017/0118787 A1* | 4/2017 | Kekki ................. H04W 76/025 |

OTHER PUBLICATIONS

Written Opinion of the International Preliminary Examining Authority for International Application No. PCT/US2015/054797, dated Nov. 7, 2016, pp. 1-7.
Kojima et al., "LTE-WiFi Link Aggregation at Femtocell Base Station", Conference, World Telecommunications Congress, Jun. 1-3, 2014, 6 pages, VDE, Berlin, Germany.
International Search Report and Written Opinion, Application No. PCT/US2015/054797, dated Jan. 12, 2016, 13 pages.
Balasubramanian, "WLAN Interworking with 2G/3G Systems", Dec. 1, 2007, Cambridge University Press, 78 pages.
Bing; "Emerging Technologies in Wireless LANs: Theory, Design, and Deployment"; Chapter 17 VLAN Tnterworking with 2G/3G Systems; Dec. 1, 2007; 12 pages.

* cited by examiner

MOBILE TERMINATED IMS CALLS ON DEVICES WHICH SUPPORT WI-FI AND CELLULAR RADIOS

PRIORITY INFORMATION

This application claims priority to U.S. provisional patent application Ser. No. 62/091,009, titled "Mobile Terminated IMS Calls on Devices Which Support Wi-Fi and Cellular Radios," filed Dec. 12, 2014, which is hereby incorporated by reference in its entirety as though fully and completely set forth herein.

FIELD

The present application relates to wireless communication systems, including to handling of mobile terminated calls on devices that support Wi-Fi and cellular radios.

DESCRIPTION OF THE RELATED ART

Wireless communication systems are rapidly growing in usage. Further, wireless communication technology has evolved from voice-only communications to also include the transmission of data, such as Internet and multimedia content.

Expanding traffic on mobile networks has increased the need for mobile data offloading, wherein a mobile device may access carrier provided services originally targeted for cellular networks over an alternative wireless network, such as Wi-Fi (WLAN). One form of mobile data offloading uses the I-WLAN (Interworking Wireless LAN) or SMOG (S2b Mobility based on GTP) architecture to supply carrier-provided services to the mobile device over Wi-Fi. These carrier-provided services may include VVM (Visual Voice-Mail), MMS (Multimedia Messaging Service), SMS (Short Messaging Service) and IMS (IP Multimedia Subsystem).

In order to reduce power consumption and improve battery life of a wireless mobile device, a power save mode may be implemented to selectively power down the mobile device's cellular and Wi-Fi radios. However, Wi-Fi infrastructure as used by the I-WLAN or SMOG architecture lacks a paging mechanism to wake up a mobile device. Hence, when the mobile device is operating on a Wi-Fi network and the UE's Wi-Fi radio is in power save mode, the mobile device may not be able to receive an incoming IMS call in a suitably timely manner.

In mobile device operation, reduction of battery consumption and call delay time is important in improving the user experience. Therefore, when a mobile device is connected with a carrier network over Wi-Fi, a mechanism is desired to allow the mobile device to promptly and efficiently receive an incoming IMS call via its Wi-Fi radio.

SUMMARY

Embodiments described herein relate to apparatus, systems, and methods for reception of calls on mobile devices. Some embodiments relate to a mobile device that may include Wi-Fi and cellular radios. The mobile device may include one or more antennas, at least one processor, a first radio configured to perform cellular communication with a cellular base station using at least one cellular radio access technology (RAT), and a second radio configured to perform Wi-Fi communication with a Wi-Fi access point.

The mobile device may be configured to establish communication on a Wi-Fi network with a cellular carrier. The mobile device may then be configured to register a first IP address with an IMS server for the Wi-Fi network communication and register a second IP address with the IMS server for the cellular network communication (or register different ports of a single IP address with Wi-Fi and cellular). Upon occurrence of a mobile terminating call from the cellular carrier, the mobile device may receive an incoming call notification on either or both of (i) the Wi-Fi network using the first IP address and (ii) the cellular network using the second IP address.

Thus, rather than registering a single IP address for the IMS APN (IP Multimedia Subsystem Access Point Name) for both Wi-Fi and cellular networks, the mobile device may register two IP addresses, a first IP address for the Wi-Fi network and a second IP address for the cellular network. When an incoming (mobile terminated) call arrives at the IMS server destined for the mobile device, the IMS server can selectively use one or both of the IP addresses to provide the call to the mobile device over either or both of the Wi-Fi network and the cellular network. As an alternative, the IMS server can use different port addresses of a common IP address to provide the incoming call to the mobile device over both Wi-Fi and cellular. This helps ensure that the mobile device receives the mobile terminated call in a timely fashion. For example, this can help to avoid situations where the mobile device is in a sleep state and does not receive a mobile terminated call over the Wi-Fi network in a timely manner.

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
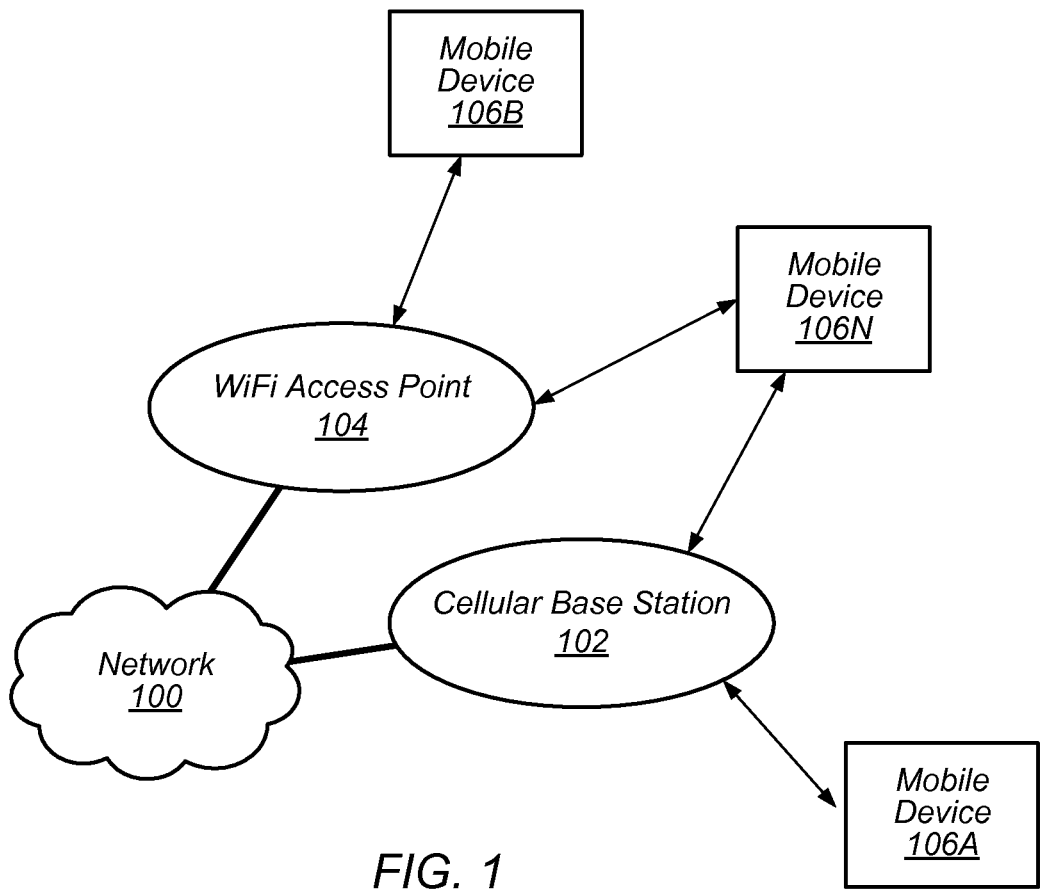
FIG. 1 illustrates an example (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.
BS: Base Station
AP: Access Point
APN: Access Point Name
LTE: Long Term Evolution
VoLTE: Voice over LTE
VOIP: Voice Over IP
IMS: IP Multimedia Subsystem
MO: Mobile Originated
MT: Mobile Terminated
RAT: Radio Access Technology
TX: Transmit
RX: Receive
WLAN: Wireless Local Area Network
I-WLAN: Interworking WLAN
SIP: Session Initiation Protocol
PDN: Packet Data Network
PGW: PDN Gateway
SGW: Serving Gateway
P-CSCF: Proxy Call Session Control Function
ePDG: evolved Packet Data Gateway
IFOM: IP Flow Mobility
SMOG: S2b Mobility based on GTP
GTP: GPRS Tunneling Protocol
GPRS: General Packet Radio Service

Glossary

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Mobile Device—any of various types of communication devices which are mobile and are capable of communicating on a cellular network and a non-cellular network, such as Wi-Fi. A UE is an example of a mobile device.

Base Station—The term "Base Station" has the full breadth of its ordinary meaning, and at least includes a wireless communication station installed at a fixed location and used to communicate as part of a wireless cellular telephone system or cellular radio system.

Access Point—The term "Access Point" has the full breadth of its ordinary meaning, and at least includes a wireless communication device which offers connectivity to a wireless local area network (WLAN), such as a Wi-Fi network.

Wi-Fi—The term "Wi-Fi" has the full breadth of its ordinary meaning, and at least includes a wireless local area network technology based on the IEEE (Institute of Electrical and Electronics Engineers) 802.11 standards, and future revisions or enhancements to those standards.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
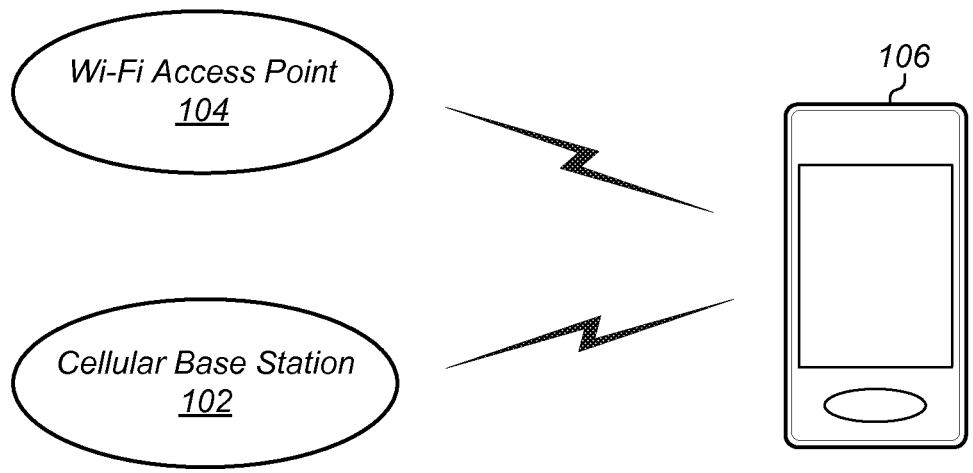
FIG. 2 illustrates an example of a mobile device in communication with a cellular base station and an access point (AP)

FIGS. 1 and 2—Communication System

FIG. 1 illustrates an exemplary (and simplified) wireless communication system. It is noted that the system of FIG. 1 is only one example of a possible system, and embodiments of the disclosure may be implemented in any of various systems, as desired.

As shown, the example wireless communication system includes a cellular base station 102, which may communicate over a transmission medium with one or more mobile devices 106A, 106B, etc., through 106N. Each of the mobile devices may be, for example, a "user equipment" (UE) or other types of devices as defined above.

The base station 102 may be a base transceiver station (BTS) or cell site, and may include hardware that enables wireless cellular communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the UEs 106 may be configured to communicate over the transmission medium using any of various cellular radio access technologies (RATs), also referred to as wireless cellular communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc. A typical wireless cellular communication system will include a plurality of cellular base stations which provide different coverage areas or cells, with handoffs between cells.

Additionally, the example wireless communication system may include one or more wireless access points (such as access point 104), which may be communicatively coupled to the network 100. Each wireless access point 104 may provide a wireless local area network (WLAN) for communication with mobile devices 106. These wireless access points may comprise Wi-Fi access points. Wireless access point 104 may be configured to support cellular network offloading and/or otherwise provide wireless communication services as part of the wireless communication system illustrated in FIG. 1.

Cellular base station 102 and other similar base stations, as well as access points (such as access point 104) operating according to a different wireless communication standard (e.g., Wi-Fi), may thus be provided as a network which may provide continuous or nearly continuous overlapping service to mobile devices 106 and similar devices over a wide geographic area via one or more wireless communication standards.

Thus, while base station 102 may act as a "serving cell" for a UE 106 as illustrated in FIG. 1, each mobile device 106 may also be capable of receiving signals from (and possibly within communication range of) one or more other cells (which might be provided by other base stations (not shown)) and/or wireless local area network (WLAN) access points, which may be referred to as "neighboring cells" or "neighboring WLANs" (e.g., as appropriate), and/or more generally as "neighbors".

FIG. 2 illustrates mobile device 106 (e.g., one of the devices 106A through 106N) in communication with both a Wi-Fi access point 104 and a cellular base station 102. The mobile device 106 may be a device with both cellular communication capability and non-cellular communication capability, e.g., Wi-Fi capability, such as a mobile phone, a hand-held device, a computer or a tablet, or virtually any type of wireless device.

The mobile device 106 may include a processing element, such as a processor that is configured to execute program instructions stored in memory. The mobile device 106 may perform any of the method embodiments described herein by executing such stored instructions. Alternatively, or in addition, the processing element in the mobile device 106 may include a programmable hardware element such as an FPGA (field-programmable gate array), or an ASIC (application-specific integrated circuit), that is configured to perform any of the method embodiments described herein, or any portion of any of the method embodiments described herein.

In some embodiments, the mobile device 106 may be configured to communicate using any of multiple radio access technologies/wireless communication protocols. For example, the mobile device 106 may be configured to communicate using any of various cellular communication technologies, such as GSM, UMTS, CDMA2000, LTE, LTE-A, etc. The mobile device may also be configured to communicate using any of various non-cellular communication technologies such as WLAN/Wi-Fi, or GNSS. Other combinations of wireless communication technologies are also possible.

The mobile device 106 may include one or more antennas for communicating using one or more wireless communication protocols or technologies. In one embodiment, the mobile device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), and/or digital processing circuitry (e.g., for digital modulation as well as other digital processing). Similarly, the radio may implement one or more receive chains and transmit chains using the aforementioned hardware. For example, the mobile device 106 may share one or more parts of a receive and/or transmit chain between multiple wireless communication technologies, such as those discussed above.

In some embodiments, the mobile device 106 may include separate transmit and/or receive chains (e.g., including separate RF and/or digital radio components) for each wireless communication protocol with which it is configured to communicate. As a further possibility, the mobile device 106 may include one or more radios which are shared between multiple wireless communication protocols, and one or more radios which are used exclusively by a single wireless communication protocol. For example, the mobile device 106 might include a shared radio for communicating using either of LTE or 1×RTT (or LTE or GSM), and separate radios for communicating using Wi-Fi and/or Bluetooth. Other configurations are also possible.

Figure 3:
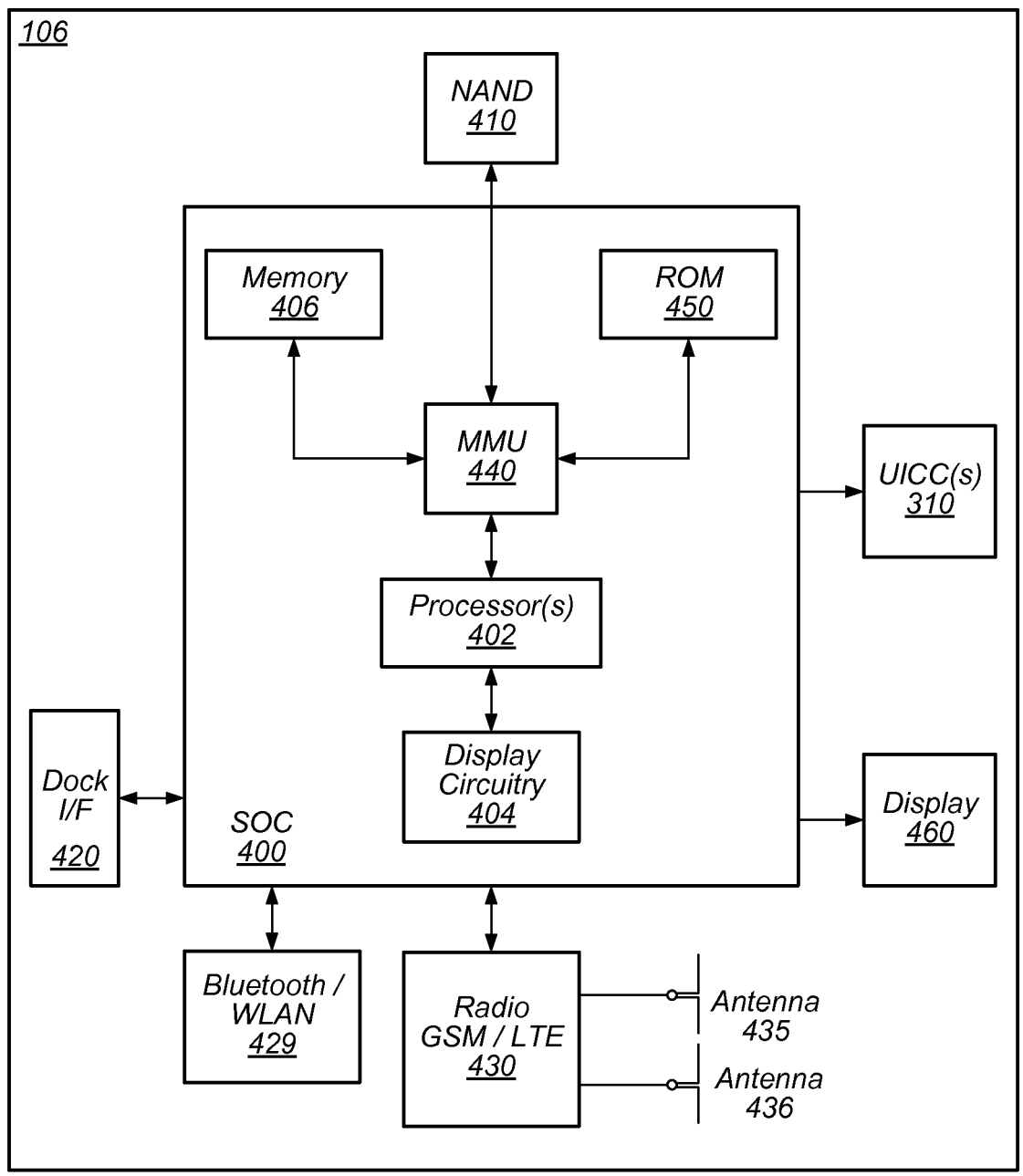
FIG. 3 illustrates an example block diagram of a mobile device.

FIG. 3—Mobile Device Block Diagram

FIG. 3 illustrates an example simplified block diagram of a mobile device 106. As shown, the mobile device 106 may include a processing element, such as a system on chip (SOC) 400, which may include portions for various purposes. The SOC 400 may be coupled to various other circuits of the mobile device 106. For example, the mobile device 106 may include various types of memory (e.g., including Flash 410), a connector interface 420 (e.g., for coupling to a computer system, dock, charging station, etc.), the display 460, cellular communication circuitry 430, such as for LTE, GSM, etc., and short range wireless communication circuitry 429 (e.g., Bluetooth™ and WLAN circuitry). The mobile device 106 may further comprise one or more smart cards 310 that include SIM (Subscriber Identity Module) functionality, such as one or more UICC(s) (Universal Integrated Circuit Card(s)) cards 310. The cellular communication circuitry 430 may couple to one or more antennas, e.g., antennas 435 and 436 as shown. The short range wireless communication circuitry 429 may also couple to one or both of the antennas 435 and 436 (this connectivity is not shown for ease of illustration).

As shown, the SOC 400 may include processor(s) 402, which may execute program instructions for the mobile device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, Flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In some embodiments, as noted above, the mobile device 106 comprises at least one smart card 310, such as a UICC 310, which executes one or more Subscriber Identity Module (SIM) applications and/or otherwise implement SIM functionality. The at least one smart card 310 may be only a single smart card 310, or the mobile device 106 may include two or more smart cards 310. Each smart card 310 may be embedded, e.g., may be soldered onto a circuit board in the mobile device 106, or each smart card 310 may be implemented as a removable smart card, an electronic SIM (eSIM), or any combination thereof. Any of various other SIM configurations are also contemplated.

As noted above, the mobile device 106 may be configured to communicate wirelessly using multiple radio access technologies (RATs). The mobile device 106 may be configured to communicate according to a WI-FI RAT and/or one or more cellular RATs, e.g., such as communicating on both WI-FI and cellular at the same time (e.g., simultaneously or interleaved). For example, the mobile device 106 may be communicating on a primary communication channel (such as WI-FI), and in response to detected degradation of the primary communication channel may establish a secondary communication channel (such as on cellular). The mobile device 106 may operate to dynamically establish and/or remove different primary and/or secondary communication channels as needed, e.g., to provide improved user experience while attempting to reduce cost.

As described herein, the mobile device 106 may include hardware and software components for implementing the features and methods described herein. The processing element, e.g., processor 402, of the mobile device 106 may be configured to implement part or all of the features described herein, e.g., by executing program instructions stored on a memory medium (e.g., a non-transitory computer-readable memory medium). Alternatively (or in addition), processing element may be configured as a programmable hardware element, such as an FPGA, or as an ASIC. Alternatively (or in addition) the processor 402 of the mobile device 106, in conjunction with one or more of the other components 400, 404, 406, 410, 420, 430, 435, 440, 450, and 460 may be configured to implement part or all of the features described herein.

Figure 4:
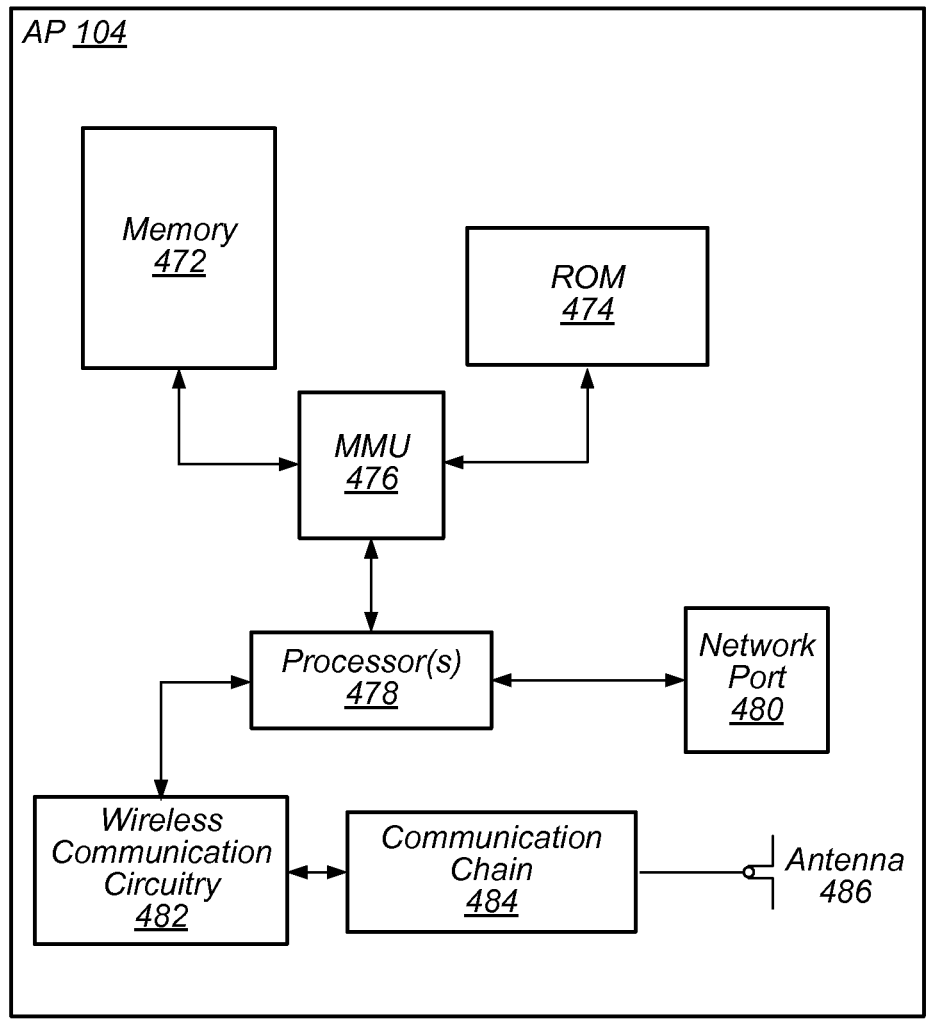
FIG. 4 illustrates an example block diagram of an access point.

FIG. 4—Access Point Block Diagram

FIG. 4 illustrates an example block diagram of an access point 104. It is noted that the access point 104 of FIG. 4 is one example of a possible access point. As shown, the access point 104 may include a processing element, such as processor(s) 478, which may execute program instructions for the base station 102. The processor(s) 478 may also be coupled to memory management unit (MMU) 476, which may be configured to receive addresses from the processor(s) 478 and translate those addresses to locations in memory (e.g., memory 472 and read only memory (ROM) 474) or to other circuits or devices.

The access point 104 may include at least one network port 480. The network port 480 may be configured to couple, via a wired or wireless connection, to a network, such as the Internet, and provide a plurality of devices, such as mobile devices 106, access to the network as described above in FIGS. 1 and 2.

The network port 480 (or an additional network port) may also be configured to couple to a cellular network, e.g., a core network of a cellular service provider. The core network may provide mobility related services and/or other services to a plurality of devices, such as mobile devices 106. In some cases, the network port 480 may couple to a telephone network via the core network, and/or the core network may provide a telephone network (e.g., among other mobile devices serviced by the cellular service provider).

The access point 104 may include at least one antenna 486, and possibly multiple antennas. The at least one antenna 486 may be configured to operate as a wireless transceiver and may be further configured to communicate with mobile devices 106 via wireless communication circuitry 482. The antenna 486 communicates with the wireless communication circuitry 482 via communication chain 484. Communication chain 484 may be one or more receive chains, one or more transmit chains, or both. The wireless communication circuitry 482 and the communication chain 484 may compose a radio. The radio may be configured to communicate via various wireless local area network standards, including, but not limited to Wi-Fi.

Cellular base station 102 may also be described according to the block diagram of FIG. 4, except that communication may be performed using any of various cellular communication technologies.

Figure 5:
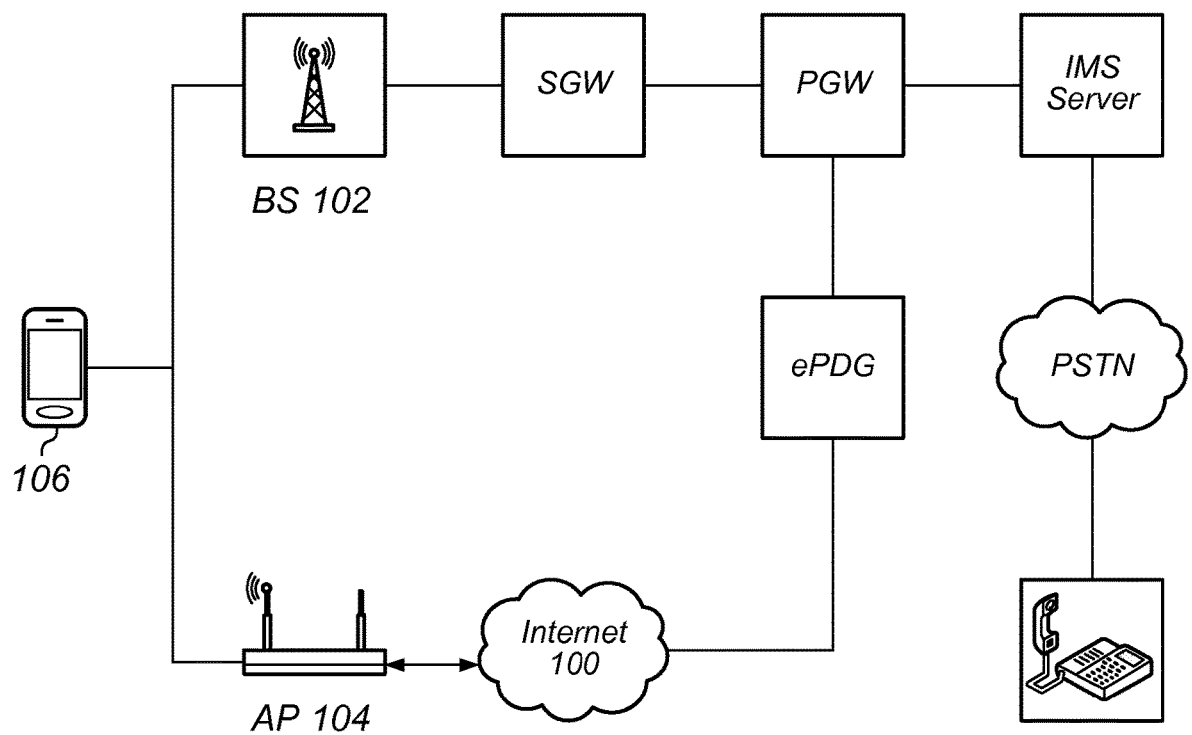
FIG. 5 is a block diagram of an example communication system.

FIG. 5—Example Wireless Communication System

FIG. 5 illustrates an example wireless communication system. As shown, the mobile device 106 may communicate with a cellular network via cellular base station (BS) 102. The cellular base station 102 may communicate with a Serving Gateway (SGW). The SGW is responsible for handovers with neighboring base stations. The SGW couples to a Packet Data Network (PDN) Gateway, or (PGW). As shown, evolved Packet Data Gateway (ePDG) operates to interface between the cellular and Wi-Fi networks. PGW assigns device IP addresses of the iWLAN tunnel interface and the cellular interface. Together the ePDG, SGW and the PGW make up the evolved packet core (EPC).

As shown, mobile device 106 may also communicate with a Wi-Fi access point (AP) 104, where the Wi-Fi access point presents a Wi-Fi network. The Wi-Fi access point 104 may couple through a network, such as the Internet 100, to the evolved Packet Data Gateway (ePDG). The ePDG is utilized in the network function of 4G mobile core networks, known as the evolved packet core (EPC) mentioned above, as well as future mobile networks, such as 5G networks. As noted above, the ePDG may act as an interface between the EPC and non-3GPP networks that may use secure access, such as Wi-Fi and femtocell access networks.

The PGW may couple to an IMS (IP Multimedia Subsystem) server. The IMS server may comprise a computer system with a processor and memory, which performs various operations as described herein. The IMS server may implement an IMS Service Layer. The IMS server may also implement a Proxy Call Session Control Function (P-CSCF). The P-CSCF may act as the entry point to the IMS domain and may serve as the outbound proxy server for the mobile device. The mobile device may attach to the P-CSCF prior to performing IMS registrations and initiating SIP sessions. The P-CSCF may be in the home domain of the IMS operator, or it may be in the visiting domain where the mobile device is currently roaming.

The IMS server may couple to other networks such as the public switched telephone network (PSTN) or other types of communication networks, e.g., for communicating with other communication devices, such as a standard POTS telephone (shown), another mobile device, etc.

Figure 6:
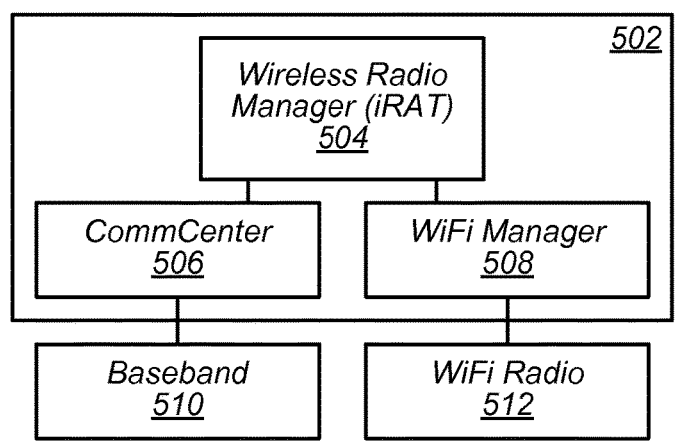
FIG. 6 illustrates various communication components present in the example mobile device.

FIG. 6—Mobile Device Functionality

FIG. 6 illustrates example functionality that may be present in a mobile device, e.g., the mobile device 106. As shown, the mobile device may comprise a RAT block 502 that comprises a wireless radio manager 504, a communication center (CommCenter) block 506, and a Wi-Fi manager block 508. The wireless radio manager 504 may be configured to receive various statistics from the communication center block 506 and/or the Wi-Fi manager block 508, and determine whether to use one or more of available cellular and Wi-Fi connections based on the statistics. In one embodiment, the communication block 506 may manage or control baseband logic 510 (e.g., related to cellular communication) and Wi-Fi manager block 508 may manage or control Wi-Fi radio 512. Although not shown, the RAT block 502 may include a symptoms manager that may report current connection information (e.g., connection metrics or statistics) to the wireless radio manager 504. Elements of the RAT block 502 may be implemented as software or firmware executable by a processor.

Figure 7A:
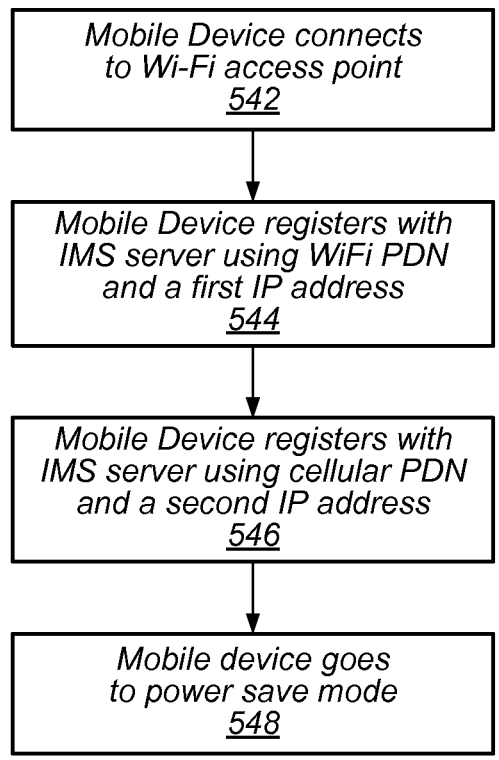
FIGS. 7A and 7B are a flowchart diagram illustrating an example of operation of the mobile device and IMS server.
Figure 7B:
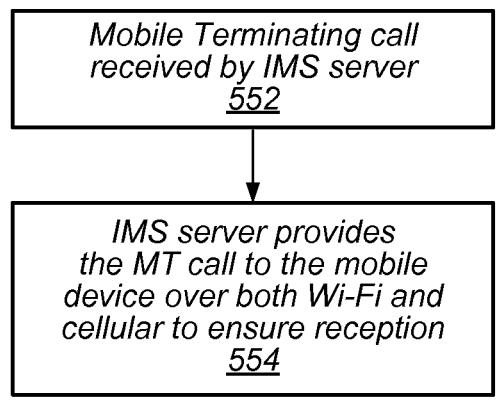

FIGS. 7A and 7B

FIGS. 7A and 7B are flowchart diagrams illustrating operation of the mobile device 106 and IMS server.

Because the Wi-Fi infrastructure does not support a paging channel, when the mobile device is connected to Wi-Fi and is in power save mode, the mobile device may not receive incoming DL packets, such as from an incoming IMS call, over the Wi-Fi network in a timely manner. The present disclosure presents a power-efficient mechanism that enables the mobile device to receive incoming calls over a Wi-Fi radio with little or no delay when the mobile device is connected with a cellular carrier over a non-cellular network, such as Wi-Fi.

Under the current implementation of I-WLAN, a mobile device utilizes one APN (Access Point Name) to register with the mobile device's carrier network. Each APN is associated with one unique IP address assigned by the carrier. In prior systems, the mobile device used the same IP address to access carrier services over both Wi-Fi and cellular networks. A mechanism such as I-WLAN or SMOG (S2a Mobility over GTP (GPRS Tunneling Protocol)) preserves the IP address when the mobile device shifts from one network to the other, e.g. from Wi-Fi to cellular. However, using a single assigned IP address may limit the operation of the mobile device, e.g., may limit the number or type of call notifications that the mobile device is able to receive.

In at least some embodiments described herein, rather than sharing a single IP address for the IMS APN (IP Multimedia Subsystem Access Point Name) for both Wi-Fi and cellular networks, the mobile device 106 may use two distinct IP addresses, a first IP address for a Wi-Fi PDN (Packet Data Network) and a second, different IP address for a cellular PDN. As an alternative, the mobile device may use two different port numbers associated with a single IP address to identify each of a Wi-Fi destination and a cellular destination on the mobile device.

As shown in FIG. 7A, at 542 the mobile device connects to a Wi-Fi access point over a Wi-Fi network. This may involve establishing a tunnel over the Wi-Fi network to the cellular carrier associated with the mobile device. The cellular carrier may be any company that provides cellular service, such as Verizon, AT&T, Sprint, T-Mobile, etc.

At 544 the mobile device registers with the IMS server using a first IP address. Here the mobile device may register with the IMS server using a Wi-Fi PDN. This enables the IMS server to provide communications to the mobile device over the Wi-Fi network. Alternatively, as noted above, the mobile device may register a first port address associated with a single IP address to identify a destination for Wi-Fi communications.

At 546 the mobile device registers with the IMS server using a second IP address. Here the mobile device may register with the IMS server using a cellular PDN. This enables the IMS server to provide communications to the mobile device over the cellular network. Alternatively, as noted above, the mobile device may register a second port address associated with a single IP address to identify a destination for cellular communications.

Thus, instead of using two different IP addresses, one for Wi-Fi and one for cellular, the mobile device may register a single IP address and use two different port numbers, where a first port number is used for incoming Wi-Fi communications and a second port number is used for incoming cellular communications.

At 548 the mobile device may optionally go into a low power mode, also referred to as a power save mode or sleep mode. As mentioned above, when the mobile device is in low power mode, the mobile device may not be able to promptly receive or acknowledge an incoming IMS call received over the Wi-Fi network (e.g., due to the lack of a paging channel on the Wi-Fi network).

As shown in FIG. 7B, at 552, when an incoming (mobile terminated ("MT")) call arrives at the IMS server destined for the mobile device, at 554 the IMS server can selectively use one or both of the IP addresses to help ensure that the mobile device receives the mobile terminated call in a timely fashion. For example, the IMS server may signal the MT call first over the Wi-Fi network to the mobile device using the first IP address. If the mobile device does not respond (answer the incoming call) within a predetermined period of time, the IMS server may then signal the MT call over the cellular network to the mobile device using the second IP address. Alternatively, the IMS server may signal the call to the mobile device on both the Wi-Fi network and cellular network simultaneously, or nearly simultaneously, to help ensure the MT call is received by the mobile device. The mobile device may receive the incoming call notification on at least one of the Wi-Fi network and the cellular network.

This method increases the likelihood that the mobile device will receive and answer an incoming call when the mobile device is communicating with a telecom carrier over a wireless LAN, such as Wi-Fi. In other words, this helps to avoid situations where the mobile device is in a low power mode and does not receive a mobile terminated call in a timely manner.

Figure 8:
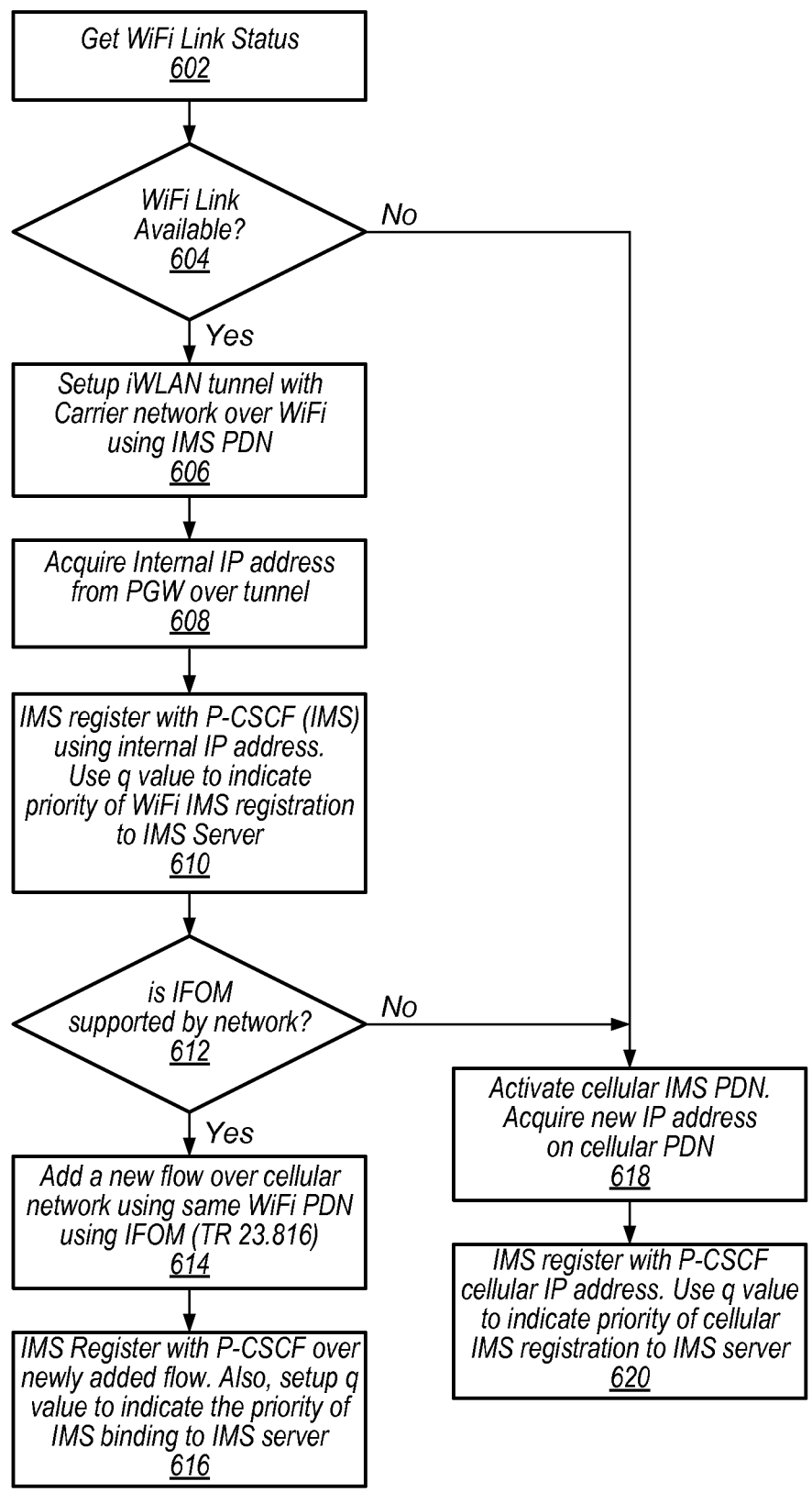
FIG. 8 is a flowchart diagram illustrating an example of operation of the mobile device connecting to a Wi-Fi network and registering with an IMS server over both Wi-Fi and cellular.

FIG. 8—Registering a Mobile Device with an IMS Server

FIG. 8 illustrates a mobile device registering with an IMS server. The method shown in FIG. 8 may be used in conjunction with any of the computer systems or devices shown in the above Figures, among other devices. For example, the method of FIG. 8 may be performed by UE 106. In various embodiments, some of the method elements shown may be performed concurrently, in a different order than shown, or may be omitted. Additional method elements may also be performed as desired. As shown, this method may operate as follows.

At 602, the mobile device may determine whether a Wi-Fi network is available, e.g., by obtaining a Wi-Fi link status. For example, the mobile device may detect a beacon from a Wi-Fi access point, which indicates the presence of a Wi-Fi network.

If a Wi-Fi network is available as determined in 604, then at 606 the mobile device may connect to its cellular carrier over the Wi-Fi network. For example, the mobile device may set up an I-WLAN tunnel with the cellular carrier (or the cellular carrier network) over the Wi-Fi network using the IMS PDN. Here the mobile device may send a message to the packet data network software executing in the IMS server to create the tunnel. Any of various tunneling protocols or virtual private network (VPN) may be used such as an IKEv2 (Internet Key Exchange version 2) tunnel, an IPsec (Internet Protocol security) tunnel, etc.

At 608, the mobile device may acquire an internal IP address, also known as a tunnel IP address, from the PDN gateway over the Wi-Fi network. The mobile device may acquire the internal IP address using the tunnel previously established on the Wi-Fi network. The IP address can be assigned during tunnel setup procedure as well. In this case, IKEv2 messages are used by the network to communicate the IP address to device. The internal IP address that is acquired by the mobile device is used as a destination (or mobile terminating) IP address for communications over the Wi-Fi network. For example, when the mobile device connects to a new Wi-Fi network, the mobile device may acquire a new internal IP address form the PDN gateway.

At 610, the mobile device may register with the IMS server using a Proxy Call Session Control Function (P-CSCF). In registering with the P-CSCF in the IMS server, the mobile device may provide its internal IP address to the IMS server, so that the IMS server can later use the internal IP address to communicate with the mobile device over the Wi-Fi network. The mobile device may also indicate a preference of Wi-Fi IMS registration to the IMS server. In other words, the mobile device may provide information to the IMS server indicating that, for future cellular communications (e.g., an IMS call) the mobile device prefers that the call be routed to it over the Wi-Fi network instead of over a cellular network.

At 612 the mobile device determines if IP Flow Mobility (IFOM) is supported by the network. For example, the mobile device may receive information from the carrier bundle indicating whether the Wi-Fi network supports IP Flow Mobility (IFOM).

When IFOM is supported by the Wi-Fi network, as determined at 612, the mobile device may add a new flow over a cellular network. The new flow over the cellular network may be created using the same Wi-Fi PDN as that used to establish the I-WLAN tunnel in 606. The new cellular network flow may be created using an industry specification, such as IFOM (TR 23.816). TR 23.816 is still in development. 3GPP is expected to define a TS (Technical Specification) document with a mechanism to set up a flow over a cellular radio.

At 614, the mobile device may register with the P-CSCF software running on the IMS server over the newly added cellular network flow. Here the mobile device may use the same IP address as that used in 610. The mobile device may also indicate a preference of IMS binding to the IMS server, e.g., using q values.

Thus, when IFOM (IP Flow Mobility) is supported by the Wi-Fi network, the mobile device can use IFOM to set up two flows for the IMS APN, where one flow is established over the Wi-Fi network and another flow is established over the cellular network. An example call flow is specified in TR 23.816. Thus, the mobile device may register with the IMS server using both Wi-Fi and cellular flows. As one example, the mobile device may register with the IMS server over a Wi-Fi flow (606) and create an additional binding with the IMS server over a cellular flow (614). As another example (not shown), the mobile device may register with the IMS server over a cellular flow and then create an additional binding with the IMS server over a Wi-Fi flow.

When IFOM is supported, the mobile device alternately may use different port numbers associated with the same IP address to uniquely define IMS registration bindings. Different port numbers are used in this instance because the mobile device uses the same IP address for both the Wi-Fi and cellular flows.

If a Wi-Fi network is not available as determined in 604 or when IFOM is not supported by the network, as determined in 612, then the mobile device may activate a cellular IMS PDN at 618. In other words, the mobile device may transmit information to the cellular network IMS PDN to acquire a new IP address (cellular IP address) on the cellular PDN. Thus, the mobile device operates to acquire two IP addresses, a first IP address associated with communications on the Wi-Fi network and a second IP address associated with communications on the cellular network.

At 620 the mobile device may register with the P-CSCF software running on the IMS server using the cellular IP address. The mobile device may also optionally indicate a preference for cellular IMS binding to the IMS server. This may be performed using q values, as mentioned above. The relative difference between the preferences provided for Wi-Fi IMS binding and cellular IMS binding may be used to determine which communication mechanism (Wi-Fi or cellular) is used first to signal a received IMS communication to the mobile device.

Thus the mobile device may register with the IMS server using both Wi-Fi and cellular PDNs, and may use a different IP address or a different port number in each registration. It is noted that the IP address is assigned during the PDN activation process. For example, the mobile device can register with the Wi-Fi PDN and add an additional binding for the cellular PDN. Alternatively, the mobile device can register with the cellular PDN and add an additional binding for the Wi-Fi PDN.

Rather than using a single IP address for IMS-APN, in at least some embodiments the mobile device uses two IP addresses per IMS-APN, a first IP address for Wi-Fi PDN and a second IP address for cellular PDN. As discussed below, when an incoming (mobile terminated) call arrives at the IMS server destined for the mobile device, the IMS server can selectively use one or both of the IP addresses (or different port numbers of the same IP address) to communicate the IMS incoming call to the mobile device over Wi-Fi, cellular, or both. This may help ensure that the mobile device receives the mobile terminated call in a timely fashion. More specifically, this helps to avoid situations where the mobile device is connected to Wi-Fi and, due to being in a sleep state, does receive a mobile terminated call in a timely manner.

Figure 9:
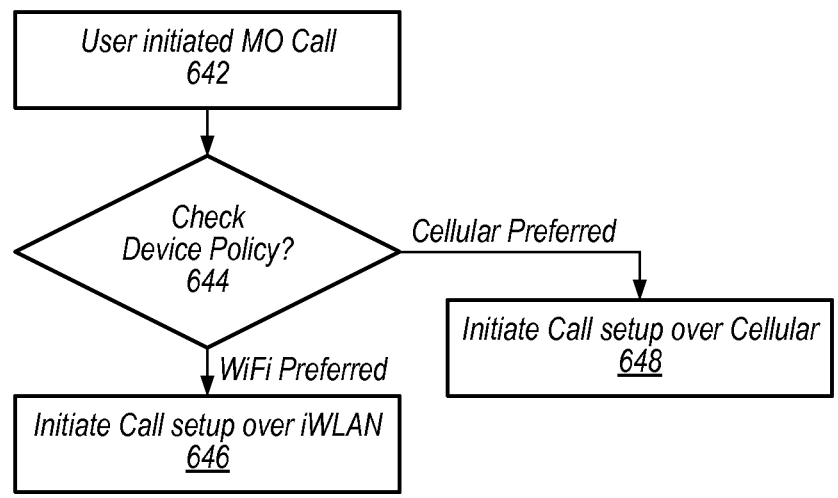
FIG. 9 is a flowchart diagram illustrating an example mobile originating call made to the mobile device.

FIG. 9—Initiating a Call to the Mobile Device

FIG. 9 illustrates a method by which an external device (e.g., another mobile device) may initiate a mobile originated call, i.e. an outgoing call, to the mobile device that established the Wi-Fi connection in FIG. 8. The device as described in FIG. 8 may also be capable of performing this operation to initiate a mobile originated call. This operation can be performed during call setup time. In various embodiments, some of the method elements shown may be performed concurrently, in a different order than shown, or may be omitted. Additional method elements may also be performed as desired. As shown, this method may operate as follows.

At 642, a user may initiate an IMS call on the external mobile device, i.e. a mobile originated (MO) call from the external mobile device. For example, a user may use the external mobile device to make an IMS call to the mobile device that performed the operations in FIG. 8. In other words, a mobile terminated (MT) IMS call is made to the mobile device of FIG. 8.

At 644, after the user initiates the mobile originated call, the MO device may determine which network to use to initiate call setup. The MO device may check internal polices that indicate a preference of the MO device towards operating over Wi-Fi or cellular networks.

At 646, if the policies as determined in 644 indicate a preference of the MO device towards Wi-Fi, the MO device may initiate call setup over a Wi-Fi network. The call setup process may utilize an I-WLAN interface to communicate with an IMS server. I-WLAN architecture allows communications that might otherwise occur over cellular networks to be conveyed over a Wi-Fi network.

At 648, if the policies as determined in 804 indicate a preference of the MO device towards cellular, the MO device may initiate call setup over a cellular network. For example, the MO device may communicate with a cellular base station to set up the call.

In either instance of 646 or 648, the MO call eventually propagates to the IMS server, and the IMS server then determines how best to propagate the MT IMS call to the mobile device. This operation is described in FIG. 10 below. It is noted that the external device that initiates the call may use a different communication mechanism (e.g., Wi-Fi or cellular) than that used by the MT device as described below.

Figure 10:
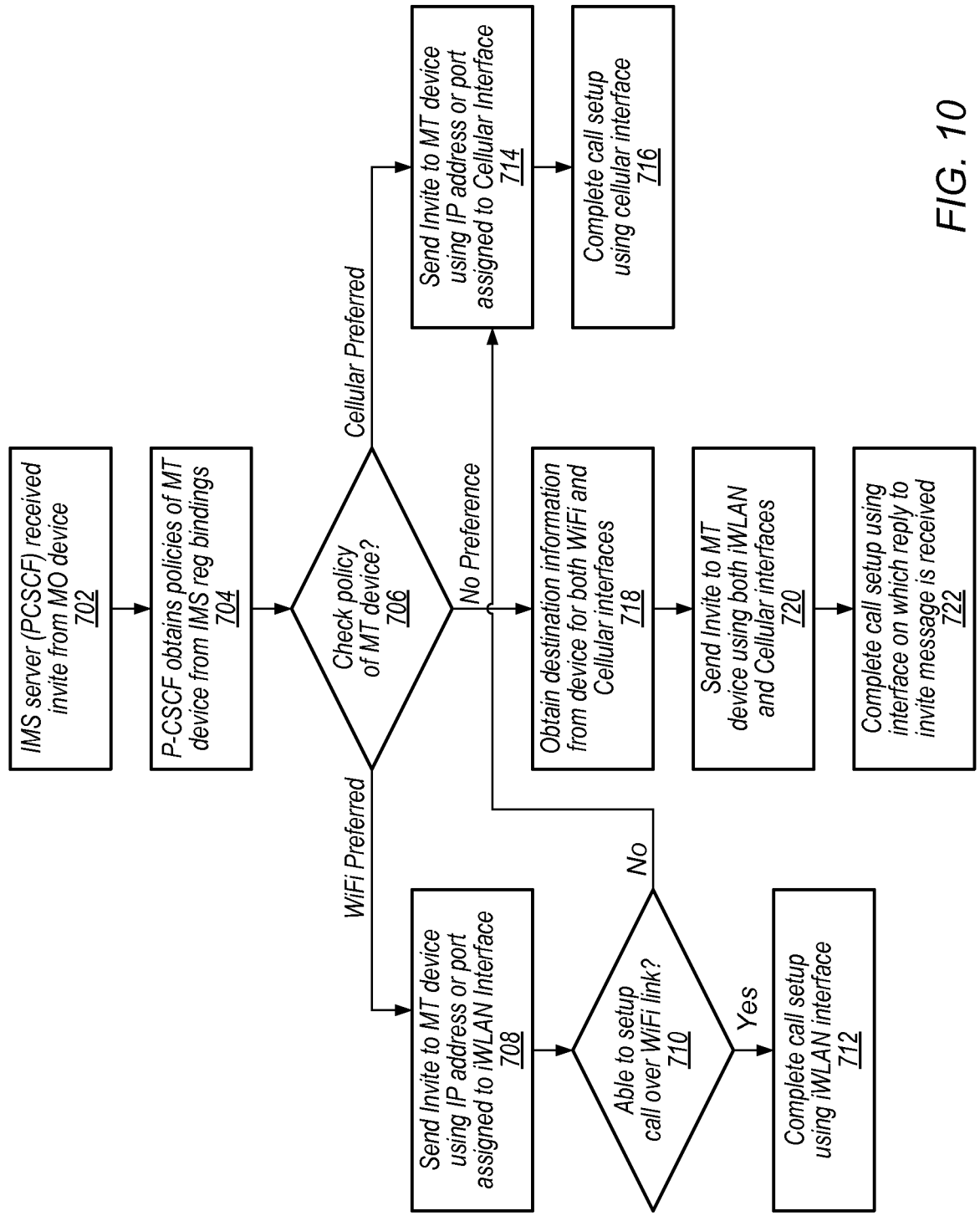
FIG. 10 is a flowchart diagram illustrating an example of operation of the IMS server providing call invites to the mobile device according to one embodiment.

FIG. 10—Establishing a Mobile Terminated Call from an IMS Server

FIG. 10 illustrates a method by which an IMS server may establish a mobile terminated call with a mobile device. In various embodiments, some of the method elements shown may be performed concurrently, in a different order than shown, or may be omitted. Additional method elements may also be performed as desired. As shown, this method may operate as follows.

At 702, an IMS server may receive an invite from a mobile originated (MO) device to initiate an IMS call. For example, as described in FIG. 9, a user may initiate a call on another mobile device (again the "other" mobile device may also have registered with the IMS server according to the method of FIG. 8), and the initiating mobile device sends an invite to the IMS server. The invite received by the IMS server may contain information designating the call's intended recipient device, i.e., the mobile terminated (MT) device.

At 704, using the designating information provided in the invite, the IMS server may look up policies associated with the MT device from the IMS regulation bindings using a Proxy Call Session Control Function (P-CSCF). These policies may indicate a preference of the MT device towards a network that the IMS server may use to contact the mobile device, e.g., whether the MT device prefers that the IMS server contact it over a Wi-Fi network or a cellular network. In some embodiments, these policies may have been saved to the IMS server upon registration of the associated mobile device with the IMS server, as presented in FIG. 8 at 610, 616, and 620.

At 706 the IMS server may determine whether the policies as obtained in 704 indicate a preference of the MT device towards a network over which the IMS server may contact the device. For example, the policies may indicate that the MT device prefers that the IMS server contact it over a Wi-Fi network, that the MT device prefers the IMS server contact it over a cellular network, or that the MT device holds no preference towards a specific network.

At 708, if the policies as determined in 706 indicate a preference of the MT device towards Wi-Fi, the IMS server may access an I-WLAN interface to obtain destination information of the MT device. As described above, I-WLAN architecture may be used to connect mobile devices with carrier-provided services over Wi-Fi (WLAN). The obtained destination information may include an IP address or port number associated with the MT device. Using this destination information, the IMS server may attempt to connect to the MT device, e.g., send an invite to the MT device, over a Wi-Fi network.

At 710, after sending an invite to the MT device, as presented in 708, the IMS server may determine whether it is possible to set up the call over a Wi-Fi network. In some embodiments, the IMS server may decide that successful call setup is possible upon receiving a certain communication from the MT device, e.g., an affirmation that the MT device successfully received the call invite and is prepared to complete call setup. Conversely, the IMS server may determine an inability to set up the call over Wi-Fi when no such communication is received for some period of time. In other words, if the IMS server has received no positive communication from the MT device for a duration of time up to a threshold value, the IMS server may decide it is not possible to set up the call over Wi-Fi. For example, this threshold value may range from 0.5 to 12 seconds, although other values may be used.

In some embodiments, in an attempt to optimize call setup time, i.e., to minimize the delay before a call is established, the IMS server may have previously received information concerning the status of the MT device's Wi-Fi network connection. The MT device may have notified the IMS server that it is not reachable via a Wi-Fi network. This notification may be conveyed over a Wi-Fi network prior to disconnection of the MT device from the same network. For example, if the MT device expects to terminate an existing connection with a Wi-Fi network, it may first use the Wi-Fi network to notify the IMS server that it will no longer be reachable over Wi-Fi. Alternately, the MT device may not be able to send such a notification over a Wi-Fi network before disconnecting from the Wi-Fi network. Disconnection of the MT device from the Wi-Fi network may be unexpected or the MT device may otherwise fail to notify the IMS server via the Wi-Fi network prior to disconnection. In this case, the MT device may use a cellular network to notify the IMS server that the MT device is unreachable over Wi-Fi. Once notified by the MT device of the MT device's inaccessibility over Wi-Fi, the IMS server may deactivate the MT device's associated Wi-Fi bindings. In this case, when another device, i.e., the MO device, attempts to contact the MT device as in 702, the IMS server may determine the MT device is unreachable over Wi-Fi and may not attempt to communicate with the device over a Wi-Fi network. This process may save time, as the IMS server may avoid attempting a possibly futile connection to the MT device over a Wi-Fi network, having been informed by the MT device that the MT device has lost such a connection.

At 712, if call setup with the MT device over Wi-Fi is deemed possible, as determined in 710, the IMS server may set up the call using the I-WLAN interface. After call setup, the call will have been established over a Wi-Fi network to the MT device.

If call setup with the MT device over Wi-Fi is deemed not possible, as determined in 710, or if the policies as determined in 706 indicate a preference of the MT device towards being reached by a cellular network, then operation proceeds to 714 and the IMS server may use a cellular network to set up the call. At 714 the IMS server may access the cellular interface to obtain destination information of the MT device. This destination information may be or may include an IP address or port number associated with the MT device. Using this destination information, the IMS server may attempt to connect to the MT device, i.e. send an invite to the MT device, over a cellular network.

Thus, if call setup over Wi-Fi is not possible for some reason, e.g., the MT device is in a low power mode, the IMS server uses the second IP address to attempt to complete the IMS call over the cellular network. For example, if the mobile device does not respond to the Wi-Fi call invite, the IMS server may attempt to complete the call using a packet-switched mechanism over cellular, such as LTE or VoLTE. Thus the mobile device's prior registration of two IP addresses allows the IMS server to communicate an IMS call to the mobile device using either or both of Wi-Fi and cellular. This increases the chance of the mobile device being able to receive an IMS call when it is connected to its cellular carrier over Wi-Fi or another similar type of network.

At 716, after sending an invite to the MT device as in 714, the IMS server may complete call setup using the cellular network.

At 718, if the MT device policies as determined in 706 indicate no preference to being reached by either cellular or Wi-Fi networks, the IMS server may attempt to reach the MT device over either or both networks. To do so the IMS server may first obtain two sets of destination information for the MT device, a first from the I-WLAN interface for Wi-Fi communications and a second from the cellular interface for cellular communications.

At 720, after retrieving the MT device's destination information, the IMS server may use a Session Initiation Protocol (SIP) forking mechanism to send invites to the MT device over both Wi-Fi and cellular networks. This may involve the use of an SIP forking proxy, which can route a call across multiple paths (Wi-Fi and cellular networks) to reach the MT device. Here the IMS server sending invites to the mobile device over both Wi-Fi and cellular simultaneously greatly improves the likelihood that the mobile device will be able to respond to the IMS call. The mobile device may simply respond to the first invite that it receives, or the mobile device may respond to the Wi-Fi and cellular invites based on a preference. For example, if the mobile device is connected to Wi-Fi but is in low power mode, and the user has previously indicated a preference for Wi-Fi, the incoming call invite received over cellular may be used by the processor in the mobile device to wake up a Wi-Fi capability of the mobile device so that it can receive the IMS call invite over Wi-Fi.

At 722, the IMS server may receive a response to the invites from the MT device over either I-WLAN or cellular interfaces. Then the IMS server may complete call setup using the interface, i.e. I-WLAN or cellular, on which the reply to the invite was received from the mobile device in 722.

Thus the method used by the IMS server to convey incoming communications to the mobile device may depend on user preference. Users may indicate a preference towards Wi-Fi or cellular networks. Where the user has indicated a preference for Wi-Fi, the IMS server may first attempt a connection over Wi-Fi. If the IMS server is unable to connect to the mobile device over Wi-Fi, the IMS server may fall back to use of the cellular network. Similarly, where the user has previously indicated a preference for cellular, the IMS server may first attempt to reach the mobile device via cellular radio, and fall back to a Wi-Fi connection should the mobile device fail to respond to the cellular invite. Where the user has not previously indicated a preference, the IMS server may transmit invites over both Wi-Fi and cellular radios. In some embodiments, a mobile device will accept only one invite and reject the other invite.

Figure 11A:
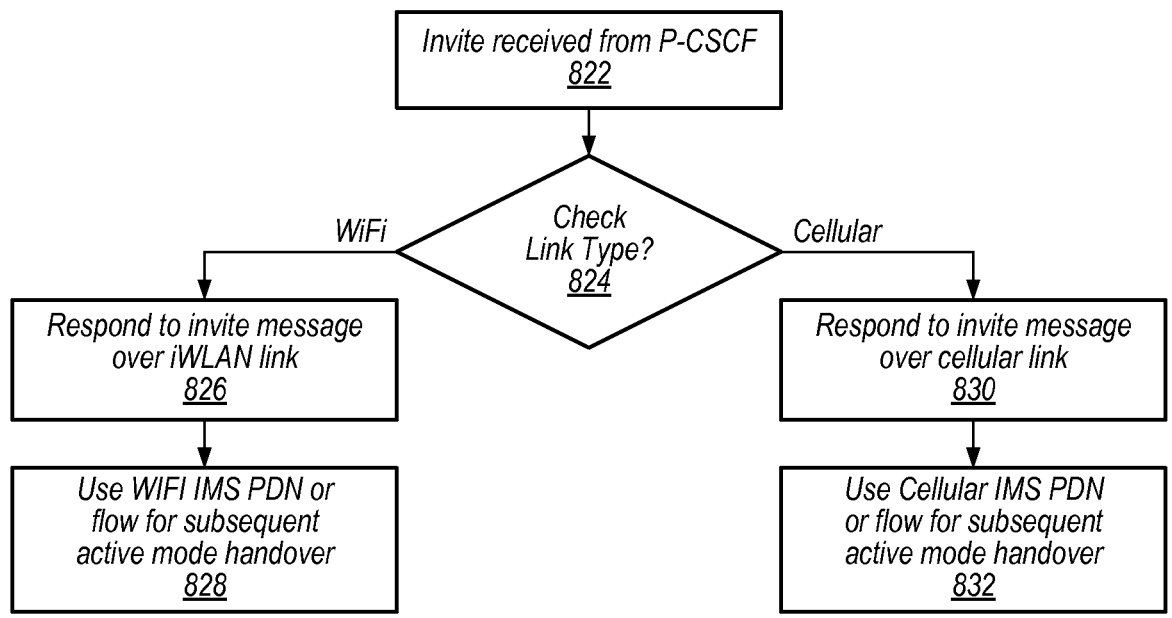
FIGS. 11A and 11B are flowchart diagrams illustrating example operation of the mobile device responding to a call invite.
Figure 11B:
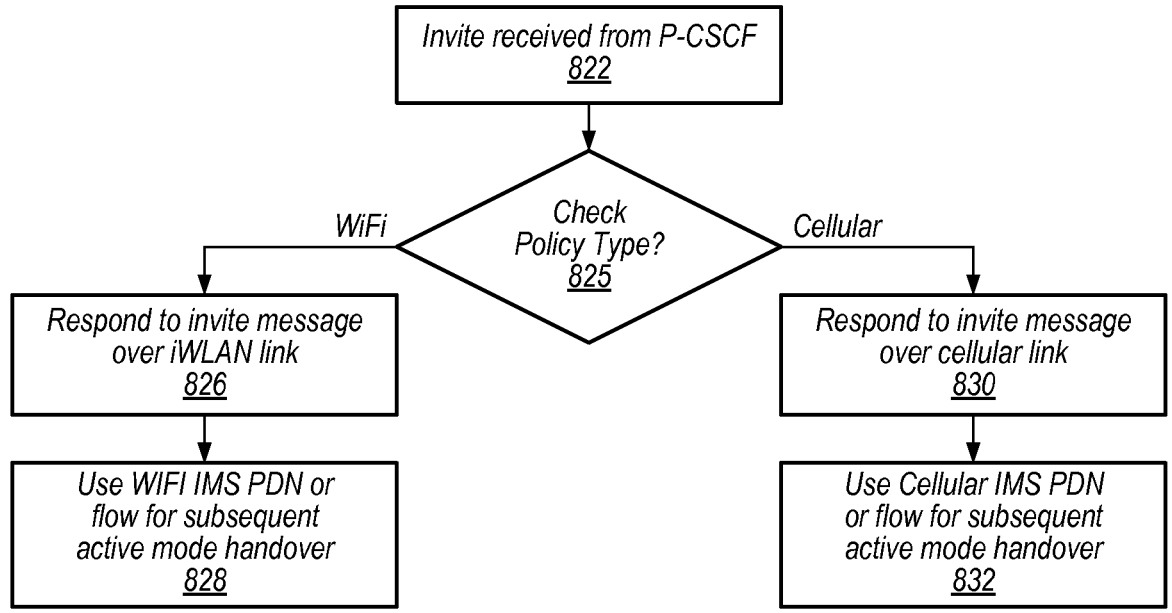

FIGS. 11A and 11B—Responding to a Mobile Terminated Call

FIGS. 11A and 11B illustrate embodiments of a method by which a mobile device may respond to a mobile terminated call, i.e. an incoming call. The method of FIGS. 11A and 11B may be performed by mobile device 106. In various embodiments, some of the method elements shown may be performed concurrently, in a different order than shown, or may be omitted. Additional method elements may also be performed as desired. As shown, this method may operate as follows.

As shown in FIG. 11A, at 822 a mobile device may receive a call invite from an IMS server. For example, the user of a different mobile device, i.e., the mobile originating (MO) device, may have initiated a call to the MT device as described in FIG. 9. An IMS server may have received the invite from the MO device and conveyed an invite to the MT device using a Proxy Call Session Control Function (P-CSCF).

At 824, the MT device may determine the type of network by which the received invite was conveyed, i.e., whether the IMS server communicated the invite to the MT device over a Wi-Fi network or a cellular network. FIG. 10 presents one embodiment of a method by which the IMS server may have selected the network to use in communicating the invite. The MT device may prioritize use of this same network in responding to the invite. In some scenarios, an invite may arrive at the mobile device.

An alternative method is shown in FIG. 11B, where instead of checking link type as shown in 824, the mobile device may check a policy type as shown in 825 of FIG. 11B. Thus in 825 the mobile device checks whether a policy exists indicating a preference for either Wi-Fi communication or cellular communication. For example, the user may have previously indicated a preference for Wi-Fi communication where possible, e.g., to save cellular data usage fees or to reduce cellular data usage. Alternatively, the user may have previously indicated a preference for cellular communication where possible, e.g., where the user is currently traveling/moving and desires to avoid potentially disruptive handoffs between Wi-Fi and cellular. In one embodiment, the mobile device may automatically select the policy type (Wi-Fi or cellular) based on the degree of current or prior mobility of the mobile device.

At 826, if the network over which the invite was conveyed by the IMS server to the MT device is a Wi-Fi network (or if the policy type indicates a preference for Wi-Fi), the mobile device may respond to the invite using I-WLAN. For example, the mobile device may use an I-WLAN tunnel with the cellular carrier (or the cellular carrier network) over the Wi-Fi network using the IMS PDN. Alternatively, the mobile device may set up such a tunnel in response to the invite.

At 828, the mobile device may use the Wi-Fi IMS PDN or flow for subsequent active mode handover, as needed. In other words, if the mobile device is currently communicating in the IMS call over Wi-Fi, and the user holding the mobile device leaves the area (leaves the vicinity of the Wi-Fi hotspot that is providing Wi-Fi coverage), the mobile device (e.g., the RAT block 502) may operate to perform handover to the cellular flow.

At 830, if the network over which the invite was conveyed by the IMS server to the MT device is a cellular network (or if the policy type indicates a preference for cellular), the mobile device may respond to the invite using the cellular network.

At 832, the mobile device may use the cellular IMS PDN or flow for subsequent active mode handover. In other words, if the mobile device is currently communicating in the IMS call over cellular, and the user holding the mobile device moves to an area where cellular coverage is weak, the mobile device (e.g., the RAT block 502) may operate to perform handover to a Wi-Fi network, if available. As another alternative, if the user has previously indicated a preference for Wi-Fi communication, such as for cost reasons, if the mobile device detects an available Wi-Fi network the mobile device may automatically initiate a handover from cellular to Wi-Fi.

Thus the network will anchor the incoming call on the PDN (and on the respective IP address) on which the call has been established (either Wi-Fi or cellular). The network will continue to support I-WLAN mobility for the anchored IP address.

Thus the mobile device will be able to actively handover a Wi-Fi anchored call to the cellular network using an I-WLAN handover mechanism (e.g., TS 23.402 or TS 24.302). The mobile device will also be able to actively handover a cellular anchored call to the Wi-Fi network using the I-WLAN handover mechanism (TS 23.402 or TS 24.302). The mobile device will further be able to use flow-based mobility to handover an active call from Wi-Fi to cellular when IFOM is supported by network.

Figure 12A:
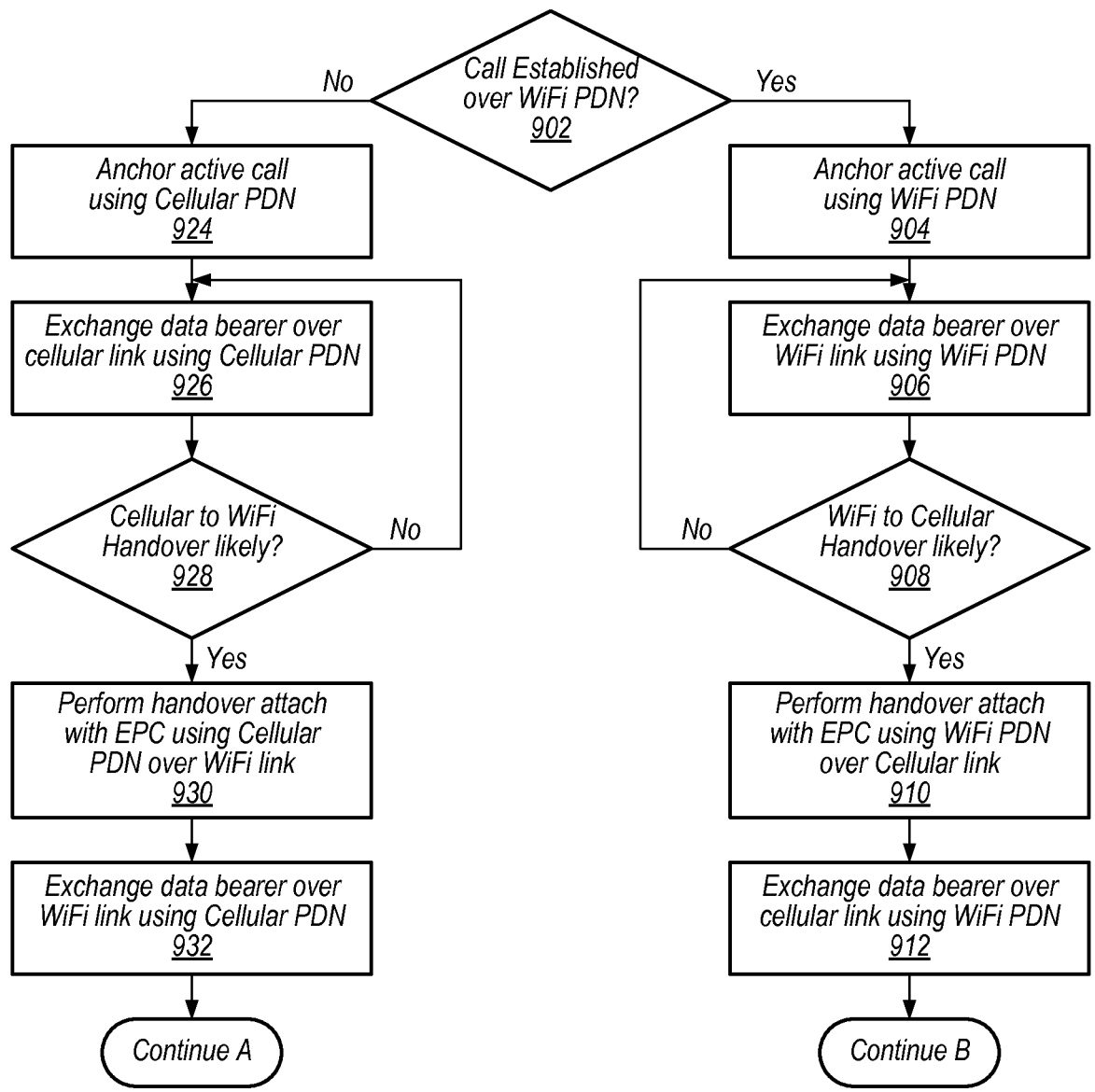
FIGS. 12A and 12B are a flowchart diagram illustrating example call flow for handover according to one embodiment.
Figure 12B:
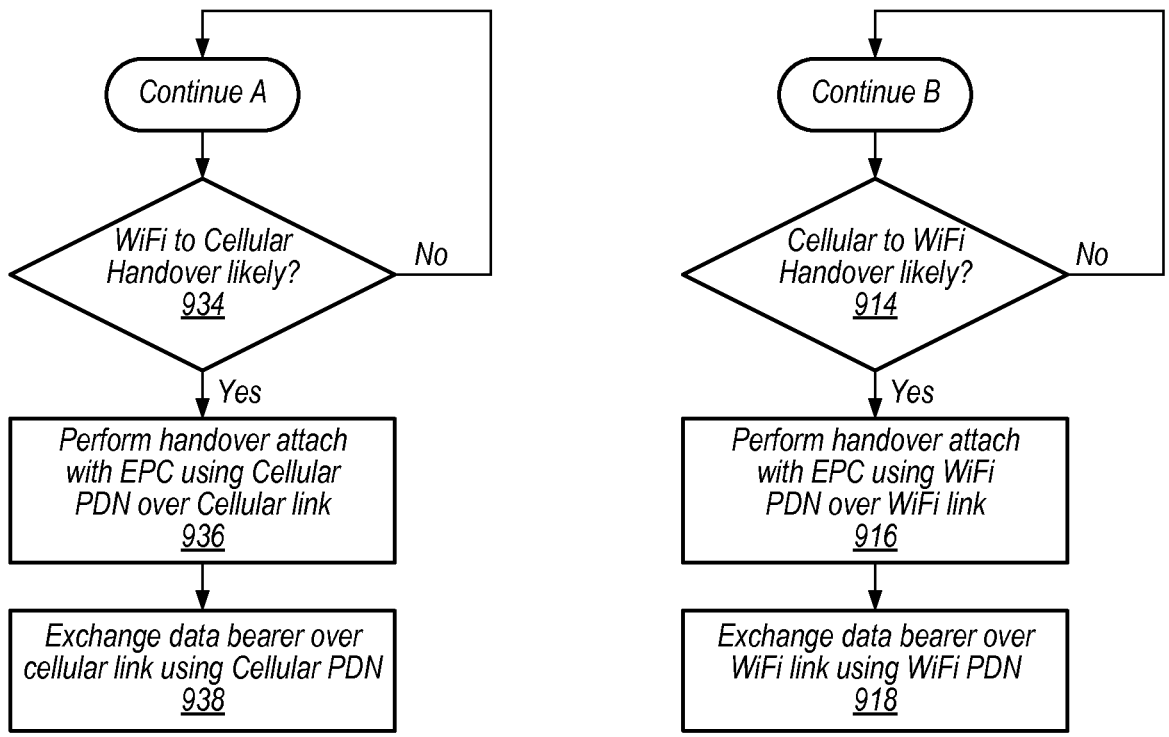

FIGS. 12A and 12B—Call Flow for Handover

FIGS. 12A and 12B illustrate a method for performing handover.

As shown, if the call has been established over a Wi-Fi PDN as determined at 902, then at 904 the active call is anchored using the Wi-Fi PDN. In other words, the active call is conducted over the Wi-Fi connection using the Wi-Fi PDN. At 906 data bearers are exchanged over the Wi-Fi link using the Wi-Fi PDN.

If Wi-Fi to cellular handover is not likely as determined at 908, then data bearers continue to be exchanged over the Wi-Fi link using the Wi-Fi PDN. If Wi-Fi to cellular handover is determined to be likely as indicated at 908, then at 910 a handover attach with the EPC (Evolved Packet Core) using the Wi-Fi PDN over the cellular link is performed. In other words, at 910 a handover to the cellular link is performed. At 912 data bearers are exchanged over the cellular link using the Wi-Fi PDN.

Continuing on to FIG. 12B, if cellular to Wi-Fi handover is not likely as determined in 914, then operation remains at 912 and data bearers are exchanged over the cellular link using the Wi-Fi PDN. If cellular to Wi-Fi handover is likely as determined in 914, then in 916 a handover attach with the EPC (Evolved Packet Core) using the Wi-Fi PDN over the Wi-Fi link is performed. In other words, at 916 a handover to the Wi-Fi link is performed. At 918 data bearers are exchanged over the Wi-Fi link using the Wi-Fi PDN.

If the call has been established over a cellular PDN as determined at 902, then at 924 the active call is anchored using the cellular PDN. In other words, the active call is conducted over the cellular connection using the cellular PDN. At 926 data bearers are exchanged over the cellular link using the cellular PDN.

If cellular to Wi-Fi handover is not likely, as determined at 928, then data bearers continue to be exchanged over the cellular link using the cellular PDN. If cellular to Wi-Fi handover is determined to be likely as indicated at 928, then at 930 a handover attach with the EPC (Evolved Packet Core) using the cellular PDN over the Wi-Fi link is performed. In other words at 930 a handover to the Wi-Fi link is performed. At 932 data bearers are exchanged over the Wi-Fi link using the cellular PDN.

Continuing on to FIG. 12B, if Wi-Fi to cellular handover is not likely as determined in 934, then operation remains at 932 and data bearers are exchanged over the Wi-Fi link using the cellular PDN. If Wi-Fi to cellular handover is likely as determined in 934, then in 936 a handover attach with the EPC (Evolved Packet Core) using the cellular PDN over the cellular link is performed. In other words at 936 a handover to the cellular link is performed. At 938 data bearers are exchanged over the cellular link using the cellular PDN.

The following numbered paragraphs describe other embodiments:

1. A mobile device, comprising:
   at least one antenna;
   a first radio, wherein the first radio is configured to perform cellular communication using at least one cellular radio access technology (RAT);
   a second radio, wherein the second radio is configured to perform Wi-Fi communication with a Wi-Fi access point;
   at least one processor coupled to the first and second radios, wherein the mobile device is configured to perform voice and/or data communications;
   wherein the mobile device is configured to:
   establish communication on a Wi-Fi network with a cellular carrier;
   register first destination information with an IMS server for receiving Wi-Fi communication;
   register second destination information with the IMS server for receiving cellular communication;
   wherein upon occurrence of a mobile terminating call from the cellular carrier the mobile device receives an incoming call notification on both the Wi-Fi network using the first destination information and the cellular network using the second destination information.

2. The mobile device of claim 1,
   wherein the first destination information is a first IP address, and wherein the second destination information is a second IP address.

3. The mobile device of claim 1,
   wherein the first destination information is a first port of a first IP address, and wherein the second destination information is a second port of the first IP address.

4. An IMS server, comprising:
   a first port for coupling to a first network;
   a second port for coupling to a second network;
   at least one processor; and
   at least one memory medium coupled to the processor;
   wherein the at least one memory medium stores a first IP address associated with a non-cellular communication medium useable by a first mobile device;
   wherein the at least one memory medium stores a second IP address associated with a cellular communication medium useable by the first mobile device;
   wherein the memory medium stores program instructions that are executable by the at least one processor to perform:
   receiving an incoming call from a second device;
   providing a call invite to the first mobile device using the non-cellular communication medium;
   if the mobile device does not respond to the call invite on the non-cellular communication medium within a first period of time, providing the call invite to the first mobile device using the cellular communication medium.

5. The IMS server of claim 4,
   wherein the program instructions are further executable by the at least one processor to perform:
   determining a preference of the mobile device for one of the non-cellular communication medium or the cellular communication medium;
   wherein the call invite is provided to the first mobile device first using the non-cellular communication medium in response to determining that the preference is for the non-cellular communication medium.

6. The IMS server of claim 4, wherein the non-cellular communication medium is Wi-Fi.

Embodiments of the present disclosure may be realized in any of various forms. For example, some embodiments of the present disclosure may be realized as a computer-implemented method, a computer-readable memory medium, or a computer system. Other embodiments of the present disclosure may be realized using one or more custom-designed hardware devices, such as ASICs. Other embodiments of the present disclosure may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A mobile device, comprising:
  at least one antenna;
  a first radio, wherein the first radio is configured to perform cellular communication with a cellular network provided by a cellular carrier using at least one cellular radio access technology (RAT);
  a second radio, wherein the second radio is configured to perform Wi-Fi communication with a Wi-Fi network;
  at least one processor communicatively coupled to the first and second radios, wherein the mobile device, using the at least one processor, is configured to perform voice and/or data communications;
  wherein the mobile device is configured to:
    establish a first connection with a cellular carrier packet data network (PDN) over the Wi-Fi network;
    acquire a first internet protocol (IP) address associated with the first connection to the cellular carrier PDN;
    register, with an internet protocol multimedia subsystem (IMS) server, the first IP address associated with the first connection to the cellular carrier PDN;
    establish a second connection to the cellular carrier PDN via the at least one cellular RAT over the cellular network;
    provide, to the IMS server at a first time, information concerning a status of the first connection with the cellular carrier PDN over the Wi-Fi network;
  wherein, in response to providing the information concerning the status and at a second time subsequent to the first time, upon occurrence of a mobile terminating call received by the IMS server from the cellular carrier while the mobile device is in a low power mode and connected to the Wi-Fi network, a first incoming call notification on the Wi-Fi network is transmitted to the mobile device using the first IP address and a second incoming call notification on the cellular network is transmitted to the mobile device using the first IP address, wherein operating in the low power mode comprises operating the second radio in a power save mode; and
  wherein the mobile device is configured to receive and respond to at least one of the first or second incoming call notifications.

2. The mobile device of claim 1,
  wherein the mobile device receives the mobile terminating call on the cellular network using the first IP address a period of time after the first incoming call notification is provided on the Wi-Fi network using the first IP address, wherein the mobile device receives the mobile terminating call on the cellular network without receiving the mobile terminating call on the Wi-Fi network.

3. The mobile device of claim 1,
  wherein after the first incoming call notification has been provided on the Wi-Fi network using the first IP address, when the mobile device does not respond to the first incoming call notification on the Wi-Fi network within a certain period of time, the mobile device receives the mobile terminating call on the cellular network using the first IP address.

4. The mobile device of claim 1, wherein the mobile device is further configured to:
  receive, from the cellular carrier, an indication of whether the Wi-Fi network supports IP flow mobility; and
  determine, based on the indication, if IP flow mobility is supported by the Wi-Fi network.

5. The mobile device of claim 1,
  wherein the mobile device is configured to accept an incoming call that is received first in time on one of the Wi-Fi network or the cellular network.

6. The mobile device of claim 1, where the mobile device is further configured to:
  accept the mobile terminating call from the cellular carrier on the Wi-Fi network using the cellular carrier PDN; and
  handover the mobile terminating call from the Wi-Fi network to the cellular network using the cellular carrier PDN.

7. The mobile device of claim 1, where the mobile device is further configured to:
  accept the mobile terminating call from the cellular carrier on the cellular network using the cellular carrier PDN; and
  handover the mobile terminating call from the cellular network to the Wi-Fi network using the cellular carrier PDN.

8. The mobile device of claim 1, wherein the information concerning the status of the first communication with the cellular carrier over the Wi-Fi network includes an indication that the mobile device is in the low power mode.

9. A method for operating a mobile device, the method comprising:
  establishing a first communication on a Wi-Fi network with a packet data network (PDN) of a cellular carrier;
  acquiring first destination information from a first packet gateway, wherein the first destination information is useable for the first connection;
  registering the first destination information with an internet protocol multimedia subsystem (IMS) server for the first connection;
  establishing a second connection on a cellular network of the cellular carrier with the PDN of the cellular carrier;
  providing, to the IMS server, information concerning a status of the first connection on the Wi-Fi network with the PDN of the cellular carrier;
  wherein, subsequent to said providing and in response to said providing information concerning the status, upon occurrence of a mobile terminating call received from the cellular carrier by the IMS server while the mobile device is in a low power mode, wherein while in the low power mode the mobile device is connected to the Wi-Fi network and a Wi-Fi radio of the mobile device is in a power save mode, a first incoming call notification on the Wi-Fi network is transmitted to the mobile device using the first destination information and a second incoming call notification on the cellular network is transmitted to the mobile device using the first destination information;
  the mobile device receiving and responding to at least one of the first or second incoming call notifications.

10. The method of claim 9,
wherein the first destination information is a first IP address, and wherein a first port of the first IP address is associated with the first connection and a second port of the first IP address is associated with the second connection.

11. The method of claim 9,
wherein the first incoming call notification on the Wi-Fi network is transmitted to the mobile device at a first time,
wherein the second incoming call notification on the cellular network is transmitted to the mobile device at a second time, wherein the second time is after the first time, wherein the second incoming call notification on the cellular network is transmitted to the mobile device based at least in part on a predetermined amount of time within which the mobile device does not respond to the first incoming call notification on the Wi-Fi network.

12. The method of claim 11, the method further comprising:
providing preference information to the IMS server indicating a preference for one of Wi-Fi communication or cellular communication;
wherein the first incoming call notification on the Wi-Fi network is transmitted to the mobile device at a first time based at least in part on the preference information.

13. The method of claim 9,
wherein the mobile terminating call is anchored using Wi-Fi,
the method further comprising:
determining whether handover to cellular is likely; and
in response to a determination that handover to cellular is likely, performing handover attach using cellular.

14. The method of claim 9,
wherein the mobile terminating call is anchored using cellular,
the method further comprising:
determining whether handover to Wi-Fi is likely; and
in response to a determination that handover to Wi-Fi is likely, performing handover attach using Wi-Fi.

15. The method of claim 9, the method further comprising:
providing, to the IMS server, an indication of a preference of IMS binding.

16. The method of claim 15, wherein the indication of the preference of IMS binding uses or more q value.

17. An apparatus for inclusion in a mobile device, the apparatus comprising:
a processing element, wherein the processing element is configured to:
establish a first connection on a Wi-Fi network with a cellular carrier packet data network (PDN);
establish a second connection with the cellular carrier PDN over a cellular network;
acquire a first IP address associated with the first connection to the cellular carrier PDN;
register the first IP address with an internet protocol multimedia subsystem (IMS) server;
provide, to the IMS server, information concerning a status of the first connection on the Wi-Fi network with the cellular carrier; and
wherein, in response to providing the information, upon occurrence of a mobile-terminated call received by the IMS server from the cellular carrier while the mobile device is in a low power mode and connected to the Wi-Fi network, a first incoming call notification is transmitted over the Wi-Fi network using the first IP address and a second incoming call notification is transmitted over the cellular network using the first IP address, wherein the low power mode comprises a Wi-Fi radio of the mobile device is in a power save mode.

18. The apparatus of claim 17,
wherein upon occurrence of a mobile terminating call from the cellular carrier the processing element receives the first incoming call notification on the cellular network using the first IP address at least when the mobile device does not answer a previous incoming call notification on the Wi-Fi network using the first IP address.

19. The apparatus of claim 17,
wherein the first incoming call notification on the Wi-Fi network using the first IP address is transmitted at a first time,
wherein, when the wireless device does not answer the first incoming call notification on the Wi-Fi network using the first IP address within a first period of time, the second-incoming call notification on the cellular network using the first IP address, is transmitted at a second time, wherein the second time is after the first time.

20. The apparatus of claim 19, wherein the processing element is further configured to:
provide preference information to the IMS server indicating a preference for one of Wi-Fi communication or cellular communication;
wherein the second incoming call notification on the Wi-Fi network is transmitted to the mobile device at a first time based at least in part on the preference information.

* * * * *